United States Patent [19]

Bach et al.

[11] Patent Number: 4,574,714
[45] Date of Patent: Mar. 11, 1986

[54] DESTRUCTION OF TOXIC CHEMICALS

[75] Inventors: Robert D. Bach, Wayne County, Mich.; Christopher J. Nagel, Cook County, Ill.

[73] Assignee: United States Steel Corporation, Pittsburgh, Pa.

[21] Appl. No.: 743,328

[22] Filed: Jun. 10, 1985

Related U.S. Application Data

[63] Continuation-in-part of Ser. No. 669,420, Nov. 8, 1984.

[51] Int. Cl.⁴ .............................................. F23G 15/00
[52] U.S. Cl. ................... 110/346; 48/197 R;
110/238; 110/250; 201/11; 202/219; 266/222;
422/186.21; 423/437; 423/481
[58] Field of Search ............... 110/235, 237, 238, 250,
110/243, 346; 75/48; 423/481, 659, 437;
422/186.21; 201/11; 202/219; 266/220, 222,
223; 60/39.04, 39.12; 48/197 R, 206

[56] References Cited

U.S. PATENT DOCUMENTS

| | | | |
|---|---|---|---|
| 2,647,045 | 7/1953 | Rummel | 48/206 |
| 3,845,190 | 10/1974 | Yosim et al. | 423/437 X |
| 3,890,908 | 6/1975 | von Klenck et al. | 110/243 |
| 4,140,066 | 2/1979 | Rathjen et al. | 110/235 |
| 4,230,053 | 10/1980 | Deardorff et al. | 110/237 X |
| 4,246,255 | 1/1981 | Grantham | 423/481 X |
| 4,400,936 | 8/1983 | Evans | 110/238 X |
| 4,402,274 | 9/1983 | Meenan et al. | 110/346 |
| 4,431,612 | 2/1984 | Bell et al. | 422/186.21 |
| 4,432,344 | 2/1984 | Bennington et al. | 110/235 X |
| 4,481,891 | 11/1984 | Takeshita et al. | 110/346 X |

Primary Examiner—Albert J. Makay
Assistant Examiner—Steven E. Warner
Attorney, Agent, or Firm—William L. Krayer

[57] ABSTRACT

Toxic chemicals such as polychlorinated biphenyls and other organic wastes are destroyed, optionally together with inorganic wastes, by injecting them, together with oxygen, into a molten bath such as is utilized in a steelmaking facility. The bath may be melted initially by induction, an electric arc or otherwise; the desired temperature greater than 2500° F. may be maintained thereafter by the reaction of the oxygen and the organic waste. Various by-products may be obtained from the gas.

21 Claims, 3 Drawing Figures

DESTRUCTION OF TOXIC CHEMICALS

This application is a continuation-in-part of co-pending application U.S. Ser. No. 669,420, filed Nov. 8, 1984, and incorporated herein.

TECHNICAL FIELD

This invention relates to the destruction of toxic wastes.

During the past thirty years over 1.4 billion pounds of polychlorinated biphenyls (PCBs) have been produced in the United States alone. Increasing public awareness and concerns of PCB contamination and toxicity to animals and man have prompted the Environmental Protection Agency (EPA) to regulate its disposal and to require the phasing out of its use. How to dispose of PCBs is only one of a number of toxic waste problems to be faced in the very near future. Current EPA estimates, based on 1981 figures, indicate an annual hazardous waste generation of seventy-one billion gallons. Organic hazardous wastes include such unattractive materials as pesticides, herbicides, hospital wastes including pathogens, paints, inks and contaminated solvents, black liquor, and explosives. Inorganic wastes such as the oxides of iron, zinc, copper, lead, magnesium, aluminum, chrominum and cadmium, various powdered metal manufacturing residues and metal containing sludges also constitute a serious environmental problem. These wastes will all require destruction at some point in their use cycle.

Contemporary examples of wastes which the EPA classifies as toxic, ignitable, corrosive, or dangerously reactive include paint sludge from appliance factories, dregs of chrome and nickel from metal-plating shops, spent raw materials for varnish, carpets, and detergents at chemical plants, solvents from dry-cleaned clothes and degreased microchips from computers, mercury from exhausted watch batteries, butane residue from disposable cigarette lighters and lye from "empty" cans of oven cleaner.

The following reactor types have been offered or used commercially as solutions to hazardous waste disposal: rotary kiln, liquid injection, multiple hearth, multiple chamber, fluidized bed, molten salt, and high efficiency boilers. Though each of these reactors has some desirable practical and theoretical operating features, none can claim profitable operation for the destruction of organic wastes, inorganic wastes and/or sludges in a single process. Of the above reactors, the rotary kiln is most commonly employed in the United States and Europe. Although such reactors can achieve a combustion efficiency of greater than 99.99 percent with organic compounds, post-combustion and high residence times are still often required.

Incineration of organic materials involves a combination of pyrolysis (1200° C.) and combustion that is initiated by a high temperature flame. Although the initial pyrolysis transforms the organic compound into a more oxidizable form, the oxidation process requires the actual collision of the resulting incipient high energy fragments with oxygen. In a conventional incinerator, such as a rotary kiln, where the reaction medium may tend to be highly viscous, it is often difficult to bring the reacting species into direct contact with oxygen. This lack of efficient mixing on a molecular level impedes the rate of destruction. These reactors are therefore typically relatively inefficient, requiring excess oxygen and, hence, more auxiliary fuel. The actual exothermic (heat liberating) reaction, attending the reaction with oxygen, occurs away from the flame tip as the reacting materials are fed through the reaction chamber. Consequently, the heat generated by these reactions cannot be utilized efficiently for the initial endothermic pyrolysis step.

In contrast, the thermal destruction or reduction of inorganic wastes is typically an endothermic process that is not amenable to classical incineration techniques. However, the thermodynamic problems associated with the destruction of such materials can be minimized by a series of chemical reactions in which thermal energy may be transformed into chemical.

For example, the thermochemical cycle involving the reduction of a metal halide with hydrogen is usually an endothermic process as exemplified for ferrous chloride:

$$FeCl_2 + H_2 \rightarrow Fe + 2\,HCl$$

However, sagacious use of products and latent heat derived from accompanying in-situ pyrolytic oxidation of carbonaceous materials in a biphasic reaction medium can ameliorate the overall thermal requirements attending this classic dechlorination, provided the reaction medium is capable of sustaining thermochemical reaction cycles in both layers, or in a single layer, or at the biphasic interface, simultaneously. While we do not wish to be bound by any theories, we propose that the following series of reactions may occur under the appropriate conditions:

$$\text{Organic Constituents} \xrightarrow{\Delta T} \text{Carbon + Fragments}$$

$$\text{Fragments} \xrightarrow{O_2} CO + H_2O$$

$$FeCl_2 + H_2O \longrightarrow FeO + 2\,HCl$$

$$FeO + C \longrightarrow Fe + CO$$

In a similar fashion, the thermal chemical requirements for desulfurization of a metal sulfide with hydrogen $$CuS + H_2 \rightarrow Cu + H_2S$$

can be abated in a combination of reactions that do not have a net endothermic effect:

$$\text{Organic Constituents} \xrightarrow{\Delta T} \text{Carbon + Fragments}$$

$$\text{Fragments} \xrightarrow{O_2} CO + H_2O$$

$$CuS + H_2O \longrightarrow CuO + H_2S$$

$$CuO + C \longrightarrow Cu + CO$$

The oxidation states of metal hydrides, oxides, nitrides, and sulfates, etc., can also be altered in a reductive manner by the interaction of carbon and/or hydrogen generated within the bath.

$$MX_m + H_2O \longrightarrow HX + MO_m \xrightarrow{C} CO + M$$

In general, discriminatory use of thermochemical reaction cycles will increase thermodynamic process efficiency and ameliorate the undesirable endothermic effect of most reductions involving inorganic compounds comprising metals, and transition metals of the periodic table. These reductions normally involve the generation or utilization of the parent oxide as an intermediate in the thermochemical cycle. The effectiveness of the intermediate reduction is based on the relative free energy of oxidation of the element(s) involved compared to the free energy of oxidation for hydrogen, carbon or carbon monoxide under the reaction conditions of the bath. For example, carbon can reduce nickel oxide to form nickel and carbon monoxide provided reaction temperatures exceed approximately 850° F.

Our survey of prior practices indicates that the art has not combined the pyrolysis and combustion of toxic wastes in the most efficient manner as we have.

A high-turbulence combustion chamber having a pulsating spiral flow will lower the residence time and temperature required for destruction, according to Rathjen et al in U.S. Pat. No. 4,140,066. Separation of PCBs from the sludge in which they are contained, followed by incineration, is described in U.S. Pat. No. 4,402,274.

We are also aware of the work of certain others in the field of coal gasification which may be relevant to a consideration of prior art processes. In Rummel's U.S. Pat. No. 2,647,045, for example, a molten slag bath obtained from the reduction of iron ore or from the "non-combustible residues of coal products" is circulated and finally divided coal is injected into the bath and a separate addition of air is also conducted along with "an endothermic gaseous reactant", i.e. water. The process was preferably conducted in two separate endothermic and exothermic zones. Thus, the elementary idea of using the latent heat of molten slag to combust coal is known. Rummel made certain improvements and variations of his basic approach, as disclosed in U.S. Pat. Nos. 2,848,473; 2,923,260, and 3,953,445, none of which enhance the relevance of the basic idea to the present disclosure. An iron bath is used for coal gasification in U.S. Pat. No. 4,388,084 and one is used, in the absence of air, in U.S. Pat. No. 3,890,908. In U.S. Pat. No. 4,389,246 to Okamura et al, on the subject of coal gasification employing a molten iron bath, the bottom-blowing of ethane is described (see particularly column 6, lines 7-14); the ethane or other hydrocarbon gas is used to stir the mixture and for this reason is considered by Okamura et al to be equivalent to oxidizing gases and inert gases as well as oxidizable gases. Hydrocarbon may be injected with oxygen as in U.S. Pat. No. 3,706,549.

Injection of fuel, oxidizing medium and/or other materials from above is also employed in Gernhardt et al U.S. Pat. No. 4,043,766, Okamura et al U.S. Pat. No. 4,389,246, Okane et al U.S. Pat. No. 4,388,084, and Bell et al U.S. Pat. No. 4,431,612.

Titus et al, in U.S. Pat. No. 3,812,620, envision a molten pool of glass and miscellaneous metals obtained during the incineration of "heterogeneous waste materials" such as municipal garbage; the various organics are "decomposed" in the pool at temperatures of the order of 1600° F. and "further pyrolyzed" ("at least some gases") at 2000° F. While the inventors (in column 5) mention the possibility of temperatures of up to "10,000° F. or more" in order to ensure that iron remains in a molten state, they do not add oxygen in the bath and appear to utilize the bath only for the thermal decomposition of miscellaneous organics. See also von Klenck et al U.S. Pat. No. 3,890,908. Yosim et al, in U.S. Pat. No. 3,845,190, also envision pyrolytic destruction in a bath followed by oxidation in a zone above it. Salt baths are also used by Greenberg in U.S. Pat. Nos. 3,974,784 and 3,647,358. Molten wastes are drained in U. S. Patent 4,346,661 to Nakamura.

The molten salt process involving the reaction of material with a hot alkali metal is typified by the disclosure of Grantham's U.S. Pat. No. 4,246,255 maintaining a bath of, for example, alkali metal carbonates, at about 700°-1000° C. Oxygen is also injected into the molten salt. Southwick, in U.S. Pat. No. 3,527,178, employs a metal bath. Separate heating and incineration zones, including molten metal, are employed in U.S. Pat. No. 3,744,438.

Molten iron is employed by Rasor in U.S. Pat. Nos. 4,187,672 and 4,244,180 as a solvent for carbon generated through the topside introduction of coal; the carbon is then partially oxidized by iron oxide during a long residence time and partially through the introduction of oxygen from above. The Rasor disclosure maintains distinct carbonization and oxidation chambers.

We are also aware of the relatively large-scale destruction of PCBs in large utility boilers through their addition to the conventional fuel in amounts up to 5%. See "Destruction of High Concentration PCBs in a Utility Boiler"by Siedhoff, Zale & Morris, proceedings of the 1983 PCB Seminar, Electric Power Research Institute. While this appears to be an expedient disposal method, and the destruction of PCBs reaches the EPA requirement of over 99.99 percent, the long-term corrosion and other effects on the high-efficiency boiler are largely unknown; likewise the oxidation cannot be as efficient as that in our own process, and in fact the handling costs for the PCBs tend to equal or exceed the fuel value.

The relative economics of hazardous waste decomposition can be enhanced by high thermodynamic process efficiencies and efficient, cost-effective recovery of energy (in the form of waste heat or fuel gas) and high-purity by-products. Minimization of the total costs associated with hazardous waste elimination (including identification, separation, storage, transportation and decomposition) appears dependent on the ability of a single process to decompose completely and efficiently all wastes regardless of composition. Generally, the economic utilization of high grade energy will be maximized when destruction occurs efficiently without auxiliary fuel addition or substantially greater than stoichiometric oxygen requirements.

Our invention includes the use, in a furnace, of a molten bath, at a temperature of at least 2500° F., of metals (including silicon) and oxides of metals having free energies of oxidation, under the temperature and oxygen partial pressure conditions of the furnace, greater than that for the conversion of carbon to carbon monoxide. Such materials include iron, nickel, copper, and their oxides, as will be more fully explained below.

Three U.S. patents issued to Rockwell International—U.S. Pat. Nos. 4,447,262, 4,246,255, and 4,017,271—disclose the use of a molten salt bath to destroy a carbonaceous material such as coal or PCB under carbon monoxide-promoting conditions, i.e. in the presence of oxygen. However, the bath employed comprises a major portion of sodium carbonate or a mixture of alkali metal carbonates and/or alkaline earth metal oxides or carbonates. While carbonates may be present in a slag portion of the bath in the present invention, they are not essential and in fact calcium carbonate in particular is undesirable since the chlorine from PCBs and other chlorine-containing waste will tend to combine with the calcium, resulting in the formation of calcium chloride which will undesirably tend to accumulate in the bath and/or slag associated with it.

In reviewing Bell et al's U.S. Pat. No. 4,431,612, the reader will note that while the authors employ a molten bath to disintegrate PCBs and similar materials, the bath must be a good electrical conductor.

Southwick, in U.S. Pat. No. 3,527,178, creates a metal or glass pool, but does not pass the material to be destroyed through it.

DISCLOSURE OF INVENTION

Our invention comprises a method of destroying wastes including at least some organic wastes comprising (1) providing, in a furnace, a molten bath of metals (preferably including either iron or silicon) and oxides of metals having free energies of oxidation under the temperature conditions and topical partial pressure of oxygen greater than that for the conversion of carbon to CO, (2) maintaining the molten bath at a viscosity no greater than 10 centipoise, and (3) continuously and conjointly injecting oxygen and organic waste into or onto said bath in a stoichiometric ratio of oxygen to the oxidizable portion of said organic waste of at least 1:1, to maintain an average residence time of said organic wastes in said furnace of at least about one-half second.

Our invention enables the disposal, in a unitary process, of organic wastes which may be contaminated with inorganic compounds and metal containing sludges. The wastes may include PCBs, tetrachlorosilane, dioxin, and other highly toxic materials. This process, which may utilize steelmaking technology and equipment such as that disclosed in Knuppel et al U.S. Pat. No. 3,706,549, comprises injection of oxygen and organic waste streams (which may include inorganics) below the surface of a molten bath, by bottom tuyere or port injection, or by lance-type injection above the surface, such that interaction can occur within the bath, in the absence of an external source of flame. The molten medium, which comprises metals, oxides, carbonates, silicon, and the like, to be described in more detail below, is maintained at a viscosity no greater than 10 centipoises and temperatures preferably in excess of 2500° F., serves to provide a thermally stable heat conducting medium for the initial bond rupturing pyrolitic sequence. Molecular oxygen can be activated by adsorption on the slag or metal surface or by incorporation as a highly reactive metal oxide, such as copper oxide. Oxides of atomic groups V, VI and VII, in forms such as $NO_3^-$, $SO_4^{32}$ and $ClO_4^-$ may also contribute oxygen for the oxidation of molecular fragments comprising carbon and hydrogen to carbon monoxide and water.

Turbulence or agitation within the molten bath, which should be substantially homogenous, facilitates efficient transfer of oxygen from incipient oxides to finely dispersed atomic carbon. However, due to a difference in density of the various by-products a slag phase may be expected to form in most applications, and, since the solubility of various oxides in the slag is typically greater than that of carbon, much of the oxygen transfer from a metal oxide will occur at the interface of the two phases. The metallic residues may either be converted to their elemental state and typically separate from the slag or be converted to a metal oxide through oxidative combustion. The reaction pathway of a given metal is determined by its affinity for oxygen at the temperature of the reaction.

Exothermic reactions, which supply the heat required to drive the endothermic destruction of inorganics and water, occur naturally in oxidative destruction of most organic compounds. The heat liberated upon formation of CO or $CO_2$ is capable of maintaining a desirable heat balance provided the heat is transferred efficiently and sufficient mixing, atomization and molecular dispersion occurs to maintain the necessary overall rate of reaction. When the proper balance of exo- and endothermic processes obtain, non-combustible inorganic wastes, which are typically incompatible with conventional combustion equipment and techniques, may be converted to their native elemental states or to their stable oxides. Viscosity of the metal and slag portions should not exceed about 10 centipoise.

We may include metals such as iron, nickel and copper within the bath, by way of in situ reduction of metal containing compounds, or from the addition of elemental iron, nickel or copper; such metals activate oxygen transfer to carbon and other elements and catalyze the pyrolytic bond cleavage of various compounds as they are introduced to the bath.

The metals and oxides of metals which we employ are those which have free energies of oxidation, under the temperature and oxygen partial pressure conditions of the furnace, which are greater than that required for the conversion of carbon to carbon monoxide. Elemental iron, nickel, cobalt, and copper at temperatures higher than about 2500° F. all satisfy this requirement.

Particularly when iron is used for the bath, a dynamic carbon balance may advantageously be maintained at about $\frac{1}{2}$% carbon to about 6% carbon, preferably about 2% to about 3%, across the molten bath by controlled continuous carbonaceous waste injection. This effective carbon balance prevents rapid refractory degradation and facilitates reaction kinetics by providing a high carbon concentration gradient. Primarily decarbonization occurs by oxidation within the melt where carbon, after being reduced to its atomic state, is easily absorbed. Decarbonization may occur in the gas phase and at the gas/liquid interface in the slag layer as well as in the metal bath. The facile formation of carbon monoxide and hydrogen from toxic wastes also affords the possibility of performing $C_1$ chemistry when that is deemed practical.

The high carbon, low ferrous oxide slag, maintained above the molten metal bath, provides a surface for exothermic radical recombination (e.g., $H+Cl \rightarrow HCl$) and a medium for sulfur or heavy metal scavenging. Gaseous elements such as hydrogen and chlorine, which are stripped from the parent compound upon injection, combine within the melt when electronic affinities are sufficient; however, where the energy of the bath overcomes these forces, formation of products such as hydrogen chloride will occur above the melt.

A most advantageous feature of our process, when compared to existing technology, is a high thermodynamic efficiency which allows the overall reduction of thermal energy required for the indirect multi-step conversion of metallic residues and inorganic compounds, which may be suspended in or entrained with an organic waste, to their metals or to their respective non-volatile oxides in a single process. This alteration of basic chemical composition and usage of thermochemical cycles, results in a significant reduction of the volume of the initial waste stream with an attendant decrease in the potential toxicity of the waste. We attribute this to the efficacy of particle collision and to the relatively efficient transfer of heat in the same bath from the reactants to (and into) the reaction medium. These singular properties may be directly translated to an economic advantage over competing methods. For example, we may inject up to about 30%, based on the organic waste, over a period of time, of endothermically reactive inorganic waste. The percentage used should not exceed that percentage which defines the condition of thermal neutrality, for longer than a very short time. This quantity is dependent upon the exothermicity of attending oxidations of organic waste, the endothermicity of simultaneously decomposing (or fracturing) inorganic waste, and the heat loss associated with the reaction vessel, as well as the overall process. In addition, by maintaining comparatively higher operating temperatures and near stoichiometric oxygen addition, thermal recovery may be enhanced and the concentrated chemically pure gaseous by-products that are uncontaminated with their progenitors may be recovered for future chemical or fuel use.

It is preferred that the reactor (furnace) be of more or less conventional design and technology. It should permit a controlled residence time distribution to ensure complete decomposition and should have no moving parts in the reaction zone to afford low maintenance. The process is preferably continuous. Slag is not undesirable as it provides a surface to facilitate the initial pyrolytic step; it may advantageously comprise 90% or more of the molten bath composition. An insulating medium should be employed around the bath to minimize heat loss thereby maximizing the thermal efficiency of the process.

Several types of existing reactors, or furnaces, may be used advantageously, although various modifications may be made, and other designs will suffice, as will become apparent in the detailed discussion of our process. The "A.O.D.", or "argon-oxygen-decarbonization" furnace is readily adaptable to our process, for example. A relatively small (ten ton) induction-type furnace may, for example, be readily adapted to practical use. A much larger unit resembling a bottom-blown basic oxygen steelmaking vessel optionally fitted with a top lance could be employed for very large scale central processing; a hot metal supply must be available. We illustrate a basic exemplary vessel.

BEST MODE OF THE INVENTION

Figure 1:
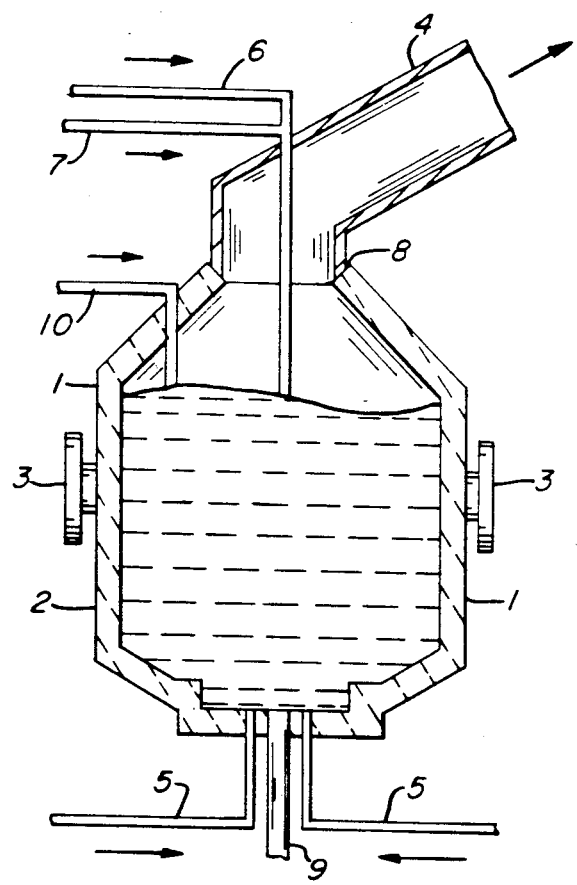
FIG. 1 is a more or less diagrammatic illustration of a top and bottom-blown vessel where an iron or other metal charge is initially heated by induction external to the bath.

Referring now to the drawings, the more or less diagrammatic depiction of a vessel suitable for the process of our invention as seen in FIG. 1 is an induction furnace comprising container walls 1 having built therein induction heat coils at 2 and having trunions 3 for ease of handling. The design also includes an off-take 4 for hot gases and means 5 for injecting an organic waste or other carbonaceous material into the bottom of the vessel, preferably concentrically through the same inlet means as oxygen.

At the top may also be intake means 6 for steam and additional oxygen if they are desired and an additional intake means 7 for other waste materials. A further inlet 10 may be provided for flux or for the additional input of waste materials. Seals 8 should be provided around the hot gas off-take so the vessel may be tilted on trunions 3 and poured. The seals 8 should be as leak-proof as possible. Molten metal or slag may be drained through a bottom drain 9. The bath level may vary considerably and may be quite high, as shown, within the vessel.

The means of injecting the endothermic and exothermic wastes and their respective ratios are important to the success of the invention.

Figure 2:
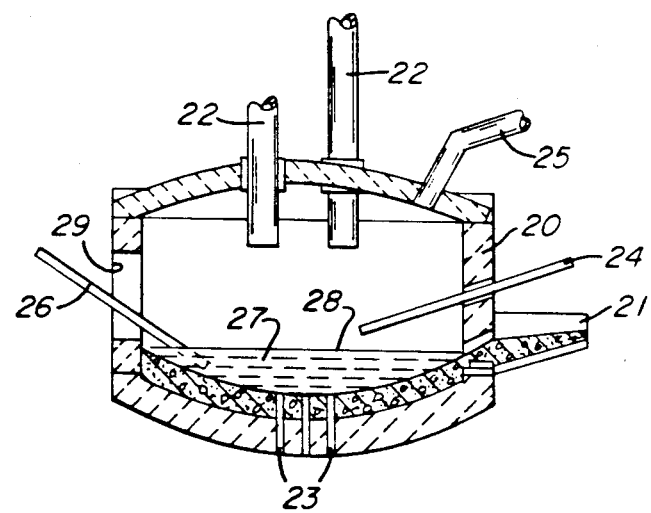
FIG. 2 is a more or less diagrammatic illustration of an electric arc furnace containing a molten pool of paradigmatic iron and fitted with bottom tuyere injection capabilities.

Referring now to FIG. 2, an electric arc furnace, tiltable in a known manner, is shown having walls 20 and a tapping spout 21, electrodes 22, and bottom tuyeres 23 for injecting a mixture of oxygen and organic waste in the bath.

Lance injection means such as the impingement type pipe lance more or less diagrammatically shown at 24 for further injecting steam, oxygen, pulverized coal, and/or organic or inorganic wastes in the top of the furnace. Injection means 24 may be water-cooled in a known manner. Iron or other metallic substances may be placed in the furnace through door 29 if desired. A consumable pipe lance 26 of a construction familiar to those skilled in the art may be used to inject waste below the surface of the molten iron 27 and slag 28.

As is known in the art, the impingement type lance is commonly of a concentric construction for the simultaneous introduction of two materials, and frequently is water-cooled in a jacket or other known manner. Typically no attempt is made to cool a consumable lance such as pipe lance 26, which must be replaced almost continuously.

INDUSTRIAL EXPLOITATION

The reader may recognize that the unit of FIG. 1 is similar to a basic bottom-blown oxygen steelmaking vessel, except for the induction heating coils, and in fact such a vessel may be considered equivalent and fully operable in our invention. Due to the very high temperatures and extremes of chemical reactions taking place, refractory linings are recommended which are known to be resistant to erosion and degradation. At such temperatures, e.g. 2500° F. and above, as high as 4000° F., persons skilled in the art will recognize that virtually any organic waste or compound will be pyrolytically destroyed. That is, the heat energy alone will immediately induce bond rupture in organic molecules and most inorganic compounds to the exclusion of certain stable metal oxides, yielding molecular fragments, uncombined carbon atoms and other atoms, such as, chlorine and hydrogen. Such highly excited carbon atoms are immediately amenable to oxidation. Any molecular fragments, e.g. activated carbonaceous species, not completely dissembled to their atomic constituents are equally susceptible to oxidation. The oxidation reaction is encouraged by the simultaneous topical and preferably concentric introduction of oxygen with oxidizable waste. The ratio of oxygen to the oxidizable components of the waste should be at least about 1:1. The concurrent introduction of oxygen (which may be in the form of air) and organic waste to be destroyed is conducted in the bath, impinging on the bath or in close proximity to the surface, so as to provide an average residence time, which may be varied within the reaction zone, such as at least one-half (½) second and preferably an average of from one (1) to three (3) seconds, or of one and one-half (1½) seconds. Within this same time frame, relatively non-volatile inorganic compounds will undergo either fragmentation or conversion to their metals or respective oxides. By a reaction zone, we mean the zone within the furnace containing the molten bath and the space immediately above it and in contact with it. One of the advantageous features of our invention is the short residence time required—generally no more than two seconds within the bath and/or the reaction zone will be required to completely destroy pyrolytically, and oxidize, any organic compound. An average residence time of at least one and one-half (1½) second is the preferred objective; preferably the residence time distribution should permit virtually no chance of chemically bound carbon, and preferably less than 5% of the carbon particles from organic compounds, having a residence time of less than one-half (½) second.

While the temperature of the bath should be at least high enough to maintain it in a molten state, generally about 2500° F., the recommended temperature for complete and total destruction may be higher for some bath compositions. Generally as the molten metal content, especially the iron content, is increased, the catalytic activity of the bath, and the total carbon dissolved by the bath, are increased; correspondingly the temperature may be reduced and still insure complete destruction of the waste. Persons skilled in the art may recognize also that the rate of carbon oxidation is also affected by the viscosity of the bath, which is also a function of its composition as well as the temperature. Uniform mixing and residence time distribution require that the viscosity of the bath should be maintained at less than 10 centipoises.

The depth of the bath and the diameter of the nozzles for oxygen and concurrent inorganic and organic waste introduction will affect the residence time; the depth of the bath will also affect the force required for proper injection of the oxygen and waste materials. Obviously the injection should be regulated so as to permit dispersion of the injected materials into the bath as soon as possible, and "blow-through" of the materials through excessive force is extremely undesirable if there is any likelihood that a portion of toxic materials will be emitted through the stack to the atmosphere without being destroyed. Several injection points are useful for this purpose if only to minimize the volume of material injected at any one point. Injectants, comprising organics, inorganics and oxygen sources, may be introduced in a known manner, such as submerged top lance, non-submerged top lance, non-submerged multi-directional port/sidewall nozzle, or bottom or sidewall tuyere(s), so as to provide introduction under the molten surface, above the molten surface, or impinging on the molten surface. For example, oxygen may be introduced by bottom or sidewall tuyeres, consumable lance or by impingement on the molten bath; solid carbonaceous materials may be introduced through bottom or sidewall tuyeres via inert carrier gas; solid inerts or inorganics, metallic or otherwise, may be introduced via non-reactive carrier gas through a top lance or multi-directional port nozzle; liquid and semi-liquid materials may be introduced above the bath or impinging on the bath by means of a top lance, multi-directional sidewall nozzle, or consumable port lance. Injections may also be made as illustrated in FIG. 2. The number and position of injection points is secondary to the principal objective of good mixing to assure the desired short residence time, pyrolytic destruction, and contact with the bath surface. The ratio of oxygen to organic material injected is ideally slightly more than stoichiometric with respect to the oxidizable portion of the organic material. The source of consumable oxygen may include elemental oxygen, air, water or chemically bound oxygen. The ratio of inorganic to combustible organic material should be adjusted so as to maintain the desired bath temperature. Oxidizable portions of any other compounds injected with the organic compounds would of course enter into the calculations. Considerable excess oxygen can be utilized.

Figure 3:
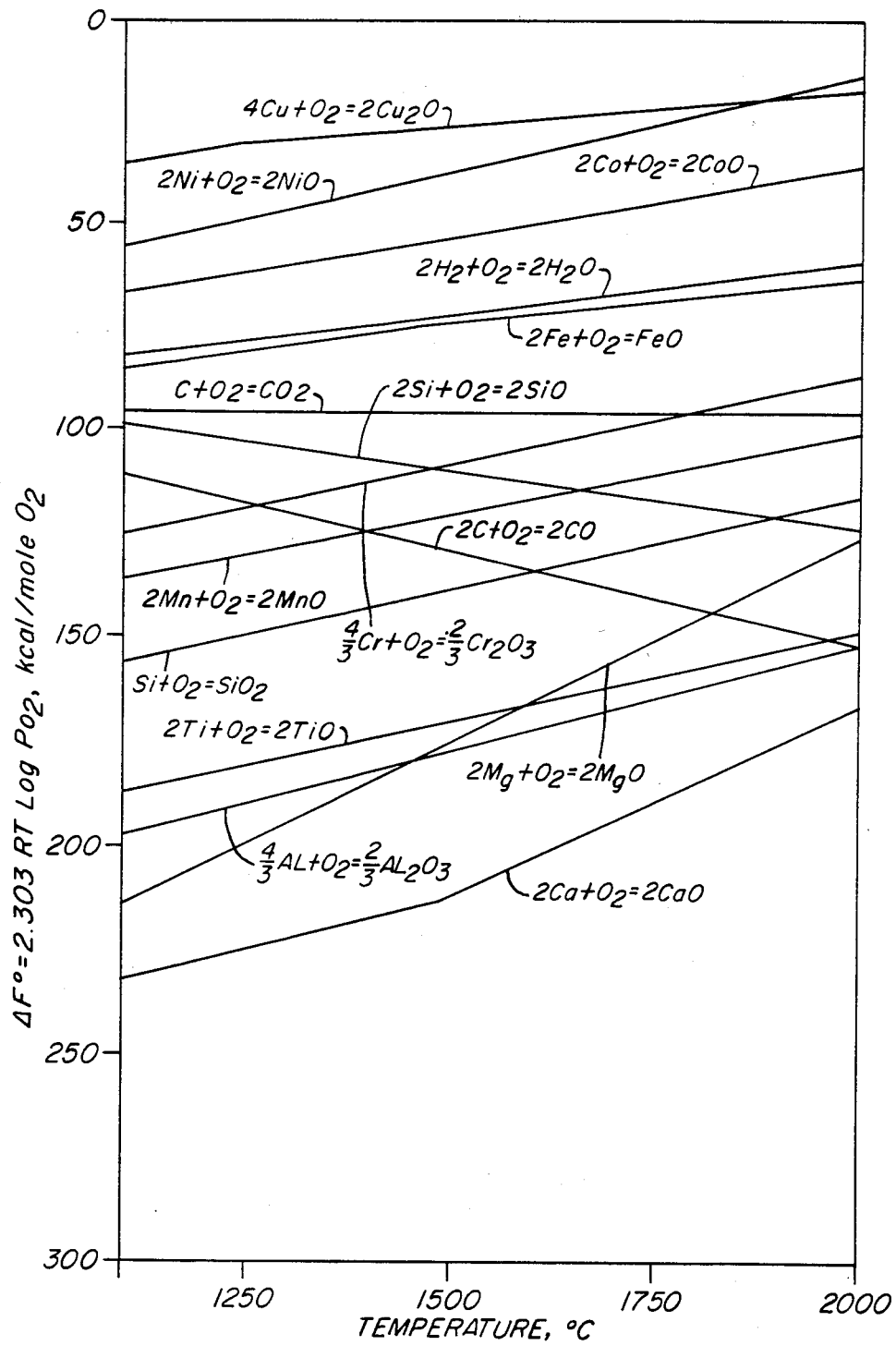
FIG. 3 is a diagram showing the relative free energies of oxidation of various metals under the preferred conditions of our furnace operation.

Referring more to FIG. 3, it may be seen that the propensity of an element to form its oxide or the tendency of that oxide to be reduced at a given temperature and partial pressure of oxygen is defined in a known manner by the relative positions of the free energy lines shown therein. For example, those elements that lie below the free energy line defined by the oxidation of carbon to carbon monoxide, such as Si, Ti and Al (in the case of Si—$SiO_2$ at temperatures lower than about 1600° C.), will tend to form their oxides that are of lower density and may accrue to a slag layer. Conversely, those oxides of Fe, Cu, Ni and Co that are readily reduced, under the equilibrium conditions attending the vagaries of mixing, and those elements which lie above the free energy line of C to CO at the temperature of the bath, will be reduced to their metallic states and reside in the metal bath.

FIG. 3 represents a portion of the plots of free energies of oxidation of certain metals and their oxides as related to the free energy of oxidation of carbon to carbon monoxide. In the conditions of the furnace, i.e. at temperature of 2500° F. to 3568° F. (2000° C.) and in the presence of oxygen, the conversion of carbon to carbon monoxide imparts a free energy of from $-125$ kcal/mole $O_2$ to $-150$ kcal/mole $O_2$. The lines from Si to SiO, 4/3 Cr to ⅔ $Cr_2O_3$, Ni to NiO, Cu to $Cu_2O$ and Fe to FeO are all higher on the scale, i.e. the oxides would be reduced generally in the order Cu, Ni, Fe, Cr, and Si.

We may use a melt comprising initially 100% metal (including silicon) and/or metal oxide above the line on FIG. 3 for the conversion of carbon to carbon monoxide. A convenient non-carbonaceous, readily oxidizable starting material is ferrosilicon, a prepared commercially available blend of iron and silicon; another is ferromagnesium. We prefer that the bath contain at least about 10% of a mixture of silicon and/or its oxides and/or metals selected from iron, nickel and copper and/or their oxides. In another preferred variation of the invention, the bath comprises initially about 5% silicon and from 0–95% metals selected from copper, nickel and iron.

The initial heating of the metal-containing charge may be accomplished, as stated elsewhere herein, by the induction coils of an induction furnace, or by any other suitable means such as the electrodes of an electric arc furnace, a lance or source of flame, or a hot charge from an external source. Once a molten state has been reached, i.e. typically at a minimum temperature of 2500° F., injection may be initiated at any time and maintained throughout, irrespective of carbon level, other than saturation, and, externally applied heat sources may be suspended if the proper ratio of organic to inorganic waste is maintained. When readily oxidizable waste is used, the exothermic reactions of the injected material will maintain the minimum temperature of 2500° F., and in fact under most circumstances and in most systems the temperature may be expected to rise. Minimum bath temperatures may, therefore, be maintained through short delays or intermittent operation by excess oxygen introduction. Under such circumstances oxygen is analogous to heat source introduction.

If the vessel employed is not well insulated and/or there is heat loss or other difficulty in maintaining the proper minimum temperature, additional carbonaceous material such as powdered coal may be injected, either directly into the bath or at a point immediately above it.

One means of controlling the excessive temperatures in addition to regulating the introduction of combustibles is to introduce such endothermic reactants as water or aqueous waste streams. For example, addition of ferric chloride will add iron at the same time that it consumes energy, and therefore provides a convenient means for controlling the temperature of a bath which has a tendency to rise. Another possible means is to recycle the effluent gas into or above the molten bath. Those skilled in the art will recognize that this has multifold purposes: (1) it can enhance bath stability if recycle injection occurs beneath the surface, (2) it can serve to raise or lower the bath temperature depending upon where the effluent gas is removed from its reaction coordinate, and (3) it can serve to alter or maintain an effluent product distribution. Generally the temperature will rise when the molar ratio in the organic waste of hydrogen to carbon is high relative to the ratio of chlorine to carbon.

The gases produced may be recovered and/or processed in any of a number of known methods. For example, HCl may be recovered by absorbing the hydrogen chloride gas in dilute hydrochloric acid. Diluted carbon monoxide may be recovered as a fuel gas by employing a partial combustion gas cleaning system or it may be recovered for other purposes such as the production of $C_1$ (chemistry) based hydrocarbons, for example methanol, which can be formed by reacting carbon monoxide, which may be recovered pure by known absorption or permeable membrane techniques, with hydrogen in catalytic reactors. Elemental chlorine may be obtained by catalytic or electrolytic methods. Carbon dioxide may be further generated in a full combustion gas cleaning system, and it may be separated by standard gas processing techniques, for example liquid absorption. The more volatile metals may be scrubbed by the above dilute hydrochloride stream if they are reactive or else trapped. The remainder of the metals will be positioned between the more dense metal layer at the bottom of the vessel and the slag layer depending upon the thermodynamic stability of the metal oxide.

We claim:

1. Method of destroying wastes including at least some organic wastes comprising (1) providing, in a furnace, a molten bath of metals and oxides of metals having free energies of oxidation, under the temperature and oxygen partial pressure conditions of the furnace, greater than that for the conversion of carbon to CO, (2) maintaining the molten bath at a viscosity no greater than 10 centipoise, and (3) continuously and conjointly introducing oxygen and organic waste into or onto said bath in a stoichiometric ratio of oxygen to the oxidizable portion of said organic waste of at least 1:1, to maintain an average residence time of said organic wastes in said furnace of at least about one-half second.

2. Method of claim 1 wherein the organic waste comprises polychlorinated biphenyls.

3. Method of claim 1 wherein the organic waste comprises dioxin.

4. Method of claim 1 wherein up to about 30%, based on the organic waste, of endothermically reactive inorganic waste is also introduced to the furnace at a rate and composition to moderate the tendency of the temperature of the bath to increase.

5. Method of claim 1 wherein water is also continuously and conjointly injected into said bath.

6. Method of claim 1 wherein the metal bath comprises at least 5% silicon, and from 0–95% metals selected from iron, nickel, and copper.

7. Method of claim 1 wherein the organic waste comprises halogen-containing and non-halogen-containing synthetic compounds and solvents.

8. Method of claim 1 wherein the wastes are injected from the side of said bath.

9. Method of claim 1 wherein oxidizable materials including wastes and inorganic wastes are introduced above the bath such that materials impinge on the surface or react in the gas phase above the surface.

10. Method of claim 1 wherein at least a portion of the effluent gas is partially recycled to a point immediately above the bath to alter or maintain product distribution.

11. Method of claim 1 wherein the effluent gas is partially recycled to the bath.

12. Method of claim 1 wherein the source of oxygen comprises molecular oxygen or air.

13. Method of pyrolytically and oxidatively destroying inorganic and/or organic waste containing significant amounts of chemically bound halogens comprising injecting said waste into a reaction zone comprising a molten bath of at least 10% silicon ano/or its oxides and metals selected from the group consisting of copper, iron and nickel and/or their oxides at a temperature of at least about 2500° F., said reaction zone contained in a reactor, said bath having a viscosity no greater than 10 centipoise, and conjointly introducing oxygen in a stoichiometric relationship to the oxidizable portion of said waste to maintain an average residence time of said organic waste in said reactor of at least about one-half second, collecting gases evolving from said bath, and recovering hydrogen halide therefrom.

14. Method of claim 13 wherein the ratio of injected waste and oxygen is regulated to maintain continuously the bath temperature at a controlled level.

15. Method of claim 13 wherein carbonaceous materials other than waste are also injected and both the waste and the other carbonaceous materials are used to maintain a desired temperature of the bath.

16. Method of claim 13 wherein the organic portion of the said waste has a residence time in the reaction zone of about 1–3 seconds.

17. Method of claim 13 wherein the temperature of the bath and a desired fraction of molten iron is regulated by the controlled addition of ferric chloride to the bath.

18. Method of claim 13 wherein the HCl is recovered by absorption in dilute hydrochloric acid.

19. Method of claim 13 wherein the wastes are injected from the side of said bath.

20. Method of claim 13 wherein oxidizable materials including wastes and inorganic wastes are introduced above the bath such that materials impinge on the surface or react in the gas phase above the surface.

21. Method of claim 13 wherein the source of oxygen comprises molecular oxygen or air.

* * * * *